(12) United States Patent
Oya et al.

(10) Patent No.: US 7,559,967 B2
(45) Date of Patent: Jul. 14, 2009

(54) HONEYCOMB FILTER

(75) Inventors: Tomokazu Oya, Ibi-gun (JP); Kazushige Ohno, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 0 days.

(21) Appl. No.: 11/855,892

(22) Filed: Sep. 14, 2007

(65) Prior Publication Data

US 2008/0083201 A1  Apr. 10, 2008

Related U.S. Application Data (63) Continuation of application No. PCT/JP2006/307763, filed on Apr. 12, 2006.

(30) Foreign Application Priority Data

May 27, 2005  (JP) .............................. 2005-156401

(51) Int. Cl.
*B01D 39/06* (2006.01)
*B01D 24/00* (2006.01)
*B01D 39/08* (2006.01)
*B01D 50/00* (2006.01)
*B01J 21/04* (2006.01)

(52) U.S. Cl. .............................. 55/523; 55/522; 55/524; 422/177; 502/439

(58) Field of Classification Search ........... 55/522–524; 422/177; 502/439
See application file for complete search history.

(56) References Cited

U.S. PATENT DOCUMENTS

| | | | |
|---|---|---|---|
| 5,080,953 A * | 1/1992 | Horikawa et al. ............ 428/116 |
| 5,106,802 A * | 4/1992 | Horiuchi et al. ............... 502/65 |
| 5,145,539 A * | 9/1992 | Horikawa et al. ......... 156/89.22 |
| 5,149,475 A * | 9/1992 | Horikawa et al. ............ 264/630 |
| 5,599,509 A * | 2/1997 | Toyao et al. ................. 422/180 |
| 5,629,067 A * | 5/1997 | Kotani et al. ................. 428/116 |
| 6,206,944 B1 * | 3/2001 | Hickman ..................... 55/523 |
| 6,764,743 B2 * | 7/2004 | Kato et al. ................... 428/118 |
| 7,208,214 B2 | 4/2007 | Ichikawa |
| 2004/0071932 A1 | 4/2004 | Ishihara et al. |
| 2004/0170803 A1 | 9/2004 | Ichikawa |

(Continued)

FOREIGN PATENT DOCUMENTS

CN  1508405  6/2004

(Continued)

OTHER PUBLICATIONS

U.S. Appl. No. 11/363,173.

(Continued)

*Primary Examiner*—Walter D Griffin
*Assistant Examiner*—Amber Orlando
(74) *Attorney, Agent, or Firm*—Ditthavong Mori & Steiner, P.C.

(57) ABSTRACT

A honeycomb filter includes a honeycomb structure in which a plurality of cells are placed in parallel with one another in the longitudinal direction with a cell wall therebetween; and a cylindrical metal casing that covers the outer peripheral side face of the honeycomb structure. A shortest distance between the outermost cells among the plurality of cells and the inner face of the metal casing is at least about 1 mm and at most about 3 mm.

53 Claims, 5 Drawing Sheets

U.S. PATENT DOCUMENTS

| | | | |
|---|---|---|---|
| 2005/0232829 A1* | 10/2005 | Fuls | 422/180 |
| 2005/0266991 A1* | 12/2005 | Ohno et al. | 502/439 |
| 2005/0272602 A1* | 12/2005 | Ninomiya | 502/439 |
| 2006/0075731 A1* | 4/2006 | Ohno et al. | 55/523 |
| 2007/0148402 A1 | 6/2007 | Ohno et al. | |
| 2007/0289275 A1 | 12/2007 | Ohno et al. | |

FOREIGN PATENT DOCUMENTS

| | | |
|---|---|---|
| JP | 2-086847 | 3/1990 |
| JP | 2002-070545 | 3/2002 |
| JP | 2002-364334 | 12/2002 |
| JP | 2004-261664 | 9/2004 |
| WO | 2005/005018 | 1/2005 |
| WO | WO/2005/005018 * | 1/2005 |

OTHER PUBLICATIONS

International Search Report, PCT/JP2006/307763, mailed Jul. 25, 2006.

* cited by examiner

A-A line cross-sectional view

HONEYCOMB FILTER

CROSS-REFERENCE TO RELATED APPLICATIONS

This application is a continuation application of PCT/JP2006/307763 filed on Apr. 12, 2006, entitled "HONEYCOMB FILTER," which claims priority of Japanese Patent Application No. 2005-156401 filed on May 27, 2005. The contents of these applications are incorporated herein by reference in their entirety.

BACKGROUND OF THE INVENTION

1. Field of the Invention

The present invention relates to a honeycomb filter.

2. Discussion of the Background

Recently, particulates such as soot, contained in exhaust gases that are discharged from internal combustion engines of vehicles such as buses and trucks and construction equipments and the like, have raised serious problems as contaminants harmful to the environment and the human body. There have been proposed various honeycomb structures made from porous ceramics and the like, which serve as filters capable of capturing particulates in exhaust gases to purify the exhaust gases.

The honeycomb structure of this type is housed in a cylindrical (can-type) metal casing with a mat-shaped member interposed in between, and used.

For example, Japanese Unexamined Patent Application Publication NO. 2002-070545 discloses a housing structure for a ceramic honeycomb structure in which a honeycomb structure, made of a material such as silicon carbide and cordierite, is housed in an annular casing through which a fluid is allowed to flow, with a heat-insulating mat-shaped member interposed between the inner peripheral face of the casing and the outer peripheral face of the honeycomb structure.

The contents of Japanese Unexamined Patent Application Publication NO. 2002-070545 are incorporated herein by reference in their entirety.

SUMMARY OF THE INVENTION

A honeycomb filter according to a first aspect of the present invention includes a honeycomb structure in which a plurality of cells are placed in parallel with one another in the longitudinal direction with a cell wall therebetween; and a cylindrical metal casing that covers the outer peripheral side face of the honeycomb structure, a shortest distance between the outermost cells among the plurality of cells and the inner face of the metal casing being at least about 1 mm and at most about 3 mm.

In the honeycomb filter according to the first aspect of the present invention, a porosity of the honeycomb structure is desirably at least about 70% and at most about 95%, and one of the end portions of each of the cells is desirably sealed.

In the honeycomb filter according to the first aspect of the present invention, a distance between the adjacent cells in the plurality of cells is desirably at least about 0.4 mm and at most about 5.0 mm.

In the honeycomb filter according to the first aspect of the present invention, an average pore diameter of the honeycomb structure is desirably at least about 1 µm and at most about 100 µm.

In the honeycomb filter according to the first aspect of the present invention, an aspect ratio of the honeycomb structure is desirably at least about 0.2 and at most about 0.9.

In the honeycomb filter according to the first aspect of the present invention, a cell density on the cross-section perpendicular to the longitudinal direction of the honeycomb structure is desirably at least about 0.16 pcs/cm$^2$ and at most about 93 pcs/cm$^2$.

In the honeycomb filter according to the first aspect of the present invention, a size of each of the cells on the cross-section perpendicular to the longitudinal direction is desirably at least about 0.8 mm×about 0.8 mm and at most about 16 mm×about 16 mm.

Moreover, in the honeycomb filter according to the first aspect of the present invention, an aperture ratio of the honeycomb structure is desirably at least about 30% and at most about 60%.

In the honeycomb filter according to the first aspect of the present invention, the honeycomb structure includes a laminate of a plurality of lamination members laminated in the longitudinal direction in such a manner that the cells are superposed on one another.

In the honeycomb filter according to the first aspect of the present invention, desirably, the lamination members mainly contains inorganic fibers, and the inorganic fibers are desirably fixed to one another with an inorganic matter. Moreover, each of the both end portions of the honeycomb structure is desirably a metal lamination member mainly containing metal with cells formed in a checkered pattern or a plate member mainly containing metal with cells formed in a checkered pattern, and a lamination member for the end portion containing metal is desirably provided on each of the both end portions of the honeycomb structure.

Also desirably, the lamination members mainly contain metal, and each of the both end portions of the honeycomb structure is desirably a metal lamination member mainly comprising metal with cells formed in a checkered pattern or a plate member mainly containing metal with cells formed in a checkered pattern. Moreover, a lamination member for the end portion containing metal is desirably provided on each of the both end portions of the honeycomb structure.

Desirably, the laminating members mainly include a porous ceramic, and a lamination member for the end portion containing metal is desirably provided on each of the both end portions of the honeycomb structure.

The plurality of lamination members desirably include a combination of a lamination member mainly containing inorganic fibers and a lamination member mainly containing metal, and each of the both end portions of the honeycomb structure is desirably a metal lamination member mainly containing metal with cells formed in a checkered pattern or a plate member mainly containing metal with cells formed in a checkered pattern. Also, a lamination member for the end portion containing metal is desirably provided on each of the both end portions of the honeycomb structure.

Moreover, the plurality of lamination members are desirably physically laminated.

In the honeycomb filter according to the first aspect of the present invention, a catalyst is desirably supported on at least one portion of the honeycomb structure.

The catalyst desirably includes platinum, palladium or rhodium.

The catalyst desirably includes platinum, palladium or rhodium, and a compound containing an alkali metal element, an alkaline-earth metal element, a rare-earth element or a transition metal element.

A honeycomb filter according to a second aspect of the present invention includes a honeycomb structure mainly containing inorganic fibers, with a plurality of cells placed in parallel with one another in the longitudinal direction with a cell wall therebetween; and a cylindrical metal casing that covers the outer peripheral side face of the honeycomb structure, a shortest distance between the outermost cells among the plurality of cells and the inner face of the metal casing being at least about 1 mm and at most about 3 mm.

In the honeycomb filter according to the second aspect of the present invention, a porosity of the honeycomb structure is desirably at least about 70% and at most about 95%, and one of the end portions of each of the cells is desirably sealed.

In the honeycomb filter according to the second aspect of the present invention, a distance between the adjacent cells in the plurality of cells is desirably at least about 0.4 mm and at most about 5.0 mm.

In the honeycomb filter according to the second aspect of the present invention, an average pore diameter of the honeycomb structure is desirably at least about 1 µm and at most about 100 µm.

In the honeycomb filter according to the second aspect of the present invention, an aspect ratio of the honeycomb structure is desirably at least about 0.2 and at most about 0.9.

In the honeycomb filter according to the second aspect of the present invention, a cell density on the cross-section perpendicular to the longitudinal direction of the honeycomb structure is desirably at least about 0.16 pcs/cm$^2$ and at most about 93 pcs/cm$^2$.

In the honeycomb filter according to the second aspect of the present invention, a size of each of the cells on the cross-section perpendicular to the longitudinal direction is desirably at least about 0.8 mm×about 0.8 mm and at most about 16 mm×about 16 mm.

In the honeycomb filter according to the second aspect of the present invention, an aperture ratio of the honeycomb structure is desirably at least about 30% and at most about 60%.

In the honeycomb filter according to the second aspect of the present invention, desirably, the honeycomb structure mainly contains inorganic fibers and is desirably provided with a honeycomb member integrally formed as a whole.

Moreover, each of the both end portions of the honeycomb structure is desirably a metal lamination member mainly containing metal with cells formed in a checkered pattern or a plate member mainly containing metal with cells formed in a checkered pattern.

A lamination member for the end portion containing metal is desirably provided on each of the both end portions of the honeycomb structure.

In the honeycomb filter according to the second aspect of the present invention, a catalyst is desirably supported on at least one portion of the honeycomb structure.

The catalyst desirably includes platinum, palladium or rhodium.

Moreover, the catalyst desirably includes platinum, palladium or rhodium, and a compound containing an alkali metal element, an alkaline-earth metal element, a rare-earth element or a transition metal element.

A honeycomb filter according to a third aspect of the present invention includes a honeycomb structure mainly containing metal, with a plurality of cells placed in parallel with one another in the longitudinal direction with a cell wall therebetween; and a cylindrical metal casing that covers the outer peripheral side face of the honeycomb structure, a shortest distance between the outermost cells among the plurality of cells and the inner face of the metal casing being at least about 1 mm and at most about 3 mm.

In the honeycomb filter according to the third aspect of the present invention, a porosity of the honeycomb structure is desirably at least about 70% and at most about 95%, and one of the end portions of each of the cells is desirably sealed.

In the honeycomb filter according to the third aspect of the present invention, a distance between the adjacent cells in the plurality of cells is desirably at least about 0.4 mm and at most about 5.0 mm.

In the honeycomb filter according to the third aspect of the present invention, an average pore diameter of the honeycomb structure is desirably at least about 1 µm and at most about 100 µm.

In the honeycomb filter according to the third aspect of the present invention, an aspect ratio of the honeycomb structure is desirably at least about 0.2 and at most about 0.9.

In the honeycomb filter according to the third aspect of the present invention, a cell density on the cross-section perpendicular to the longitudinal direction of the honeycomb structure is desirably at least about 0.16 pcs/cm$^2$ and at most about 93 pcs/cm$^2$.

In the honeycomb filter according to the third aspect of the present invention, a size of each of the cells on the cross-section perpendicular to the longitudinal direction is desirably at least about 0.8 mm×about 0.8 mm and at most about 16 mm×about 16 mm.

In the honeycomb filter according to the third aspect of the present invention, an aperture ratio of the honeycomb structure is desirably at least about 30% and at most about 60%.

In the honeycomb filter according to the third aspect of the present invention, desirably, the honeycomb structure mainly contains metal and is desirably provided with a honeycomb member integrally formed as a whole.

Each of the both end portions of the honeycomb structure is desirably a metal lamination member mainly containing metal with cells formed in a checkered pattern or a plate member mainly containing metal with cells formed in a checkered pattern.

A lamination member for the end portion containing metal is desirably provided on each of the both end portions of the honeycomb structure.

In the honeycomb filter according to the third aspect of the present invention, a catalyst is desirably supported on at least one portion of the honeycomb structure.

The catalyst desirably includes platinum, palladium or rhodium.

Moreover, the catalyst desirably includes platinum, palladium or rhodium, and a compound containing an alkali metal element, an alkaline-earth metal element, a rare-earth element or a transition metal element.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

The honeycomb filter according to the embodiments of the first aspect of the present invention includes a honeycomb structure in which a plurality of cells are placed in parallel with one another in the longitudinal direction with a cell wall therebetween; and a cylindrical metal casing that covers the outer peripheral side face of the honeycomb structure, a shortest distance between the outermost cells among the plurality of cells and the inner face of the metal casing being at least about 1 mm and at most about 3 mm.

The honeycomb filter according to the embodiments of the second aspect of the present invention includes a honeycomb structure in which a plurality of cells are placed in parallel with one another in the longitudinal direction with a cell wall therebetween, and mainly containing inorganic fibers; and a cylindrical metal casing that covers the outer peripheral side face of the honeycomb structure, a shortest distance between the outermost cells among the plurality of cells and the inner face of the metal casing being at least about 1 mm and at most about 3 mm.

The honeycomb filter according to the embodiments of the third aspect of the present invention includes a honeycomb structure in which a plurality of cells are placed in parallel with one another in the longitudinal direction with a cell wall therebetween, and mainly containing metal; and a cylindrical metal casing that covers the outer peripheral side face of the honeycomb structure, a shortest distance between the outermost cells among the plurality of cells and the inner face of the metal casing being at least about 1 mm and at most about 3 mm.

The honeycomb filters according to the embodiments of the first to third aspects of the present invention have a relation between superordinate and subordinate concepts, and are virtually included in one inventive concept. Therefore, in the following description, these aspects of the invention are collectively described for the honeycomb filters according to the embodiments of the present invention.

In the honeycomb filter according to the embodiments of the present invention, the shortest distance between outermost cells and the inner face of the metal casing is at least about 1 mm and at most about 3 mm.

In the case where the shortest distance is about 1 mm or more, the cell walls on the outside of the outermost cells tend not to be damaged (occurrence of cracks, raptures or the like). In contrast, the shortest distance of about 3 mm or less tends to make the temperature gradient inside the honeycomb structure smaller to cause exhaust gases to easily flow through not only the center portion but also the entire portion of the honeycomb structure relatively, with the result that a sufficient capture efficiency tends to be ensured.

Figure 1:
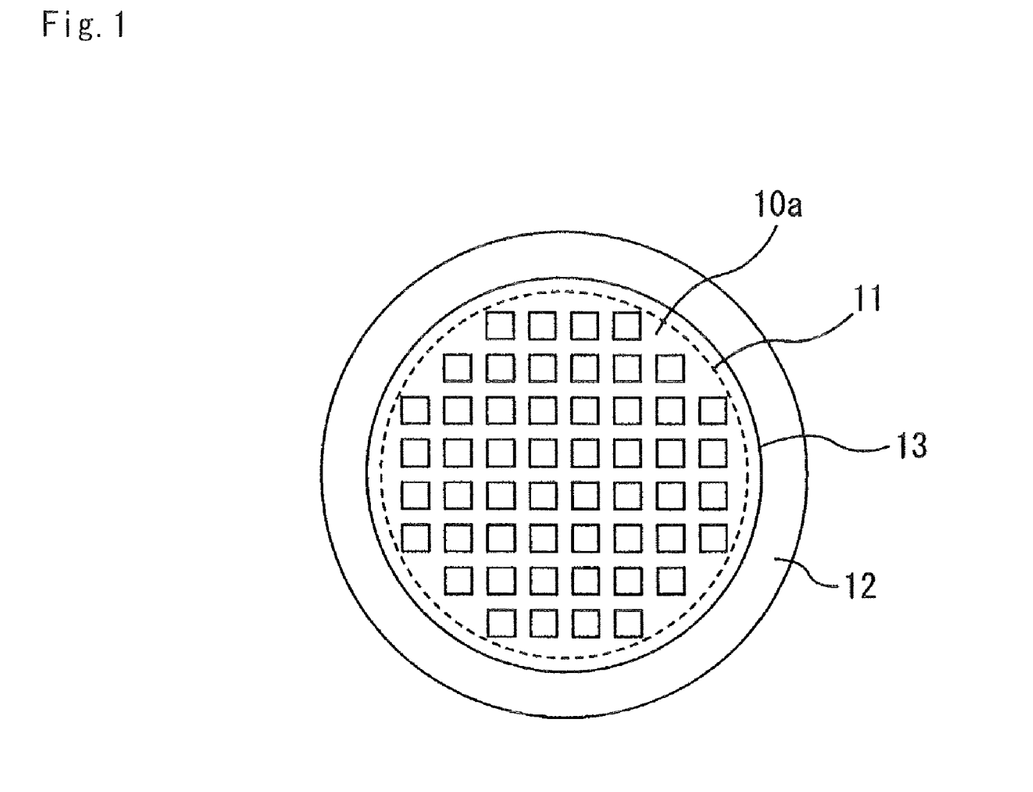
FIG. 1 is a cross-sectional view that shows one example of a honeycomb filter according to one embodiment of the present invention.

In the honeycomb filter according to the embodiments of the present invention, the shortest distance between the outermost cells and the inner face of the metal casing is defined as follows: as shown in FIG. 1, when a hypothetical minimum shape 11 (hereinafter, referred to also as a minimum inclusion shape of cells, and indicated by a broken line in FIG. 1), which has a similar shape to the shape of the inner circumference of a cross-section perpendicular to the longitudinal direction of the metal casing 12 on the cross-section perpendicular to the longitudinal direction of the honeycomb filter, is formed, it corresponds to the shortest distance made between the minimum inclusion shape 11 of cells and the inner face 13 of the metal casing 12. FIG. 1 is a cross-sectional view showing one example of the honeycomb filter according to the embodiments of the present invention. In this figure, reference numeral 10a represents the honeycomb structure.

Here, in the honeycomb filter according to the embodiments of the present invention, normally, the center of gravity of the minimum inclusion shape 11 of cells and the center of gravity of the shape formed by the inner face 13 of the metal casing 12 are superposed on each other in the cross-section perpendicular to the longitudinal direction; however, the two centers of gravity are not necessarily superposed on one another, and the two centers of gravity may deviate from each other, as long as the shortest distance of the two shapes is at least about 1 mm and at most about 3 mm.

The honeycomb filter according to the embodiments of the present invention includes a honeycomb structure in which a plurality of cells are placed in parallel with one another in the longitudinal direction with a cell wall therebetween, and a cylindrical (can-type) metal casing that covers the outer peripheral side face of the honeycomb structure.

Although the shape of the honeycomb structure shown in the following drawings is a cylindrical shape, the shape is not limited to the cylindrical shape, and may be, for example, a cylindroid shape, a rectangular pillar shape or the like, and also may be any other shape.

In particular, in the case where the honeycomb structure is placed right under an engine, since the space is extremely limited, the shape of the filter may also need to be formed into a complex shape.

In the case where a honeycomb structure having a complex shape is manufactured, the laminated honeycomb structure described later is desirably used. The honeycomb structure of this type is suitably processed into a desired structure and shape.

Moreover, in the above-mentioned honeycomb structure, the distance between adjacent cells (thickness of the cell wall) is desirably set to about 0.4 mm or more. With such distance, a honeycomb structure, even those with a high porosity, tends to capture particulates inside the cell walls easily and on the surface of the cell walls, therefore, a high capture efficiency tends to be achieved.

In the present specification, a cell wall refers to a wall that separates the adjacent cells.

Moreover, the upper limit value of the distance between adjacent cells (thickness of the cell wall) is desirably set to about 5.0 mm.

If the thickness of the cell wall does not become too thick, the aperture ratio and/or filtering area does not become too small, therefore, the pressure loss tends not to increase. Ashes generated upon burning particulates also tend not to be discharged. Moreover, supposing that the range in which deep-layer-filtering of the particulates is carried out is referred to as an effective region of the wall for soot capturing, the ratio at which the effective region occupies in the cell wall tends to decrease.

Moreover, with respect to the average pore diameter of the honeycomb structure, although not particularly limited, the lower limit value is desirably set to about 1 μm, and the upper limit value is desirably set to about 100 μm. The average pore diameter of about 1 μm or more tends to allow particulates to be deep-layer-filtered inside the cell wall, so that they tend to be made in contact with the catalyst supported on the inside of the cell wall. In contrast, the average pore diameter of about 100 μm or less tends not to allow particulates to pass through the pores, so that the particulates tend to be sufficiently captured and the honeycomb structure tends to function as a filter surely.

The above-mentioned porosity and average pore diameter can be measured through known methods such as a mercury injection method using a mercury porosimeter, a weighing method, Archimedes method and a measuring method using a scanning electron microscope (SEM).

With respect to the porosity of the honeycomb structure, the lower limit value is desirably set to about 70% and the upper limit value is desirably set to about 95%.

In the porosity of about 70% or more, ashes generated upon burning particulates tends to pass through the cell walls, and not to deposit on the surface or the inside of the cell walls, therefore, the pressure loss due to the deposited ashes tends not to increase. In contrast, in the porosity of about 95% or less, sufficient strength of the honeycomb structure tends to be obtained.

As described below, the porosity in the case where a catalyst is supported on the honeycomb structure means the porosity after the catalyst is supported.

Moreover, with respect to the aspect ratio of the honeycomb structure, the lower limit value thereof is desirably about 0.2, and the upper limit value thereof is desirably about 0.9.

In the case where the aspect ratio is about 0.2 or more, the initial pressure loss tends not to become greater, and the entire honeycomb structure tends to be effectively used, regardless of the shape of an exhaust gas purifying device in which the honeycomb structure is installed. In contrast, in the aspect ratio of about 0.9 or less, the resistance that is imposed on exhaust gases when passing through the inside of each cell tends not to become greater, therefore, the pressure loss tends not to become greater.

Here, the aspect ratio of the honeycomb structure refers to a ratio of the length of the honeycomb structure in the longitudinal direction to the diameter of the cross-section perpendicular to the longitudinal direction of the honeycomb structure.

With respect to the cell density on the cross-section perpendicular to the longitudinal direction of the honeycomb structure, although not particularly limited, the lower limit thereof is desirably set to about 0.16 pcs/cm$^2$ (about 1.0 pcs/in$^2$), and the upper limit thereof is desirably set to about 93 pcs/cm$^2$ (about 600 pcs/in$^2$); more desirably, the lower limit value is set to about 0.62 pcs/cm$^2$ (about 4.0 pcs/in$^2$), and the upper limit value is set to about 77.5 pcs/cm2 (about 500 pcs/in2).

Moreover, with respect to the size of the cell on the cross-section perpendicular to the longitudinal direction of the honeycomb structure, although not particularly limited, the lower limit thereof is desirably set to about 0.8 mm×about 0.8 mm, and the upper limit thereof is desirably set to about 16 mm×about 16 mm.

The aperture ratio of the honeycomb structure is desirably set to a lower limit value of about 30% and an upper limit value of about 60%.

In the aperture ratio of about 30% or more, the pressure loss when exhaust gases flow in and out of the honeycomb structure tends not to increase. In contrast, in the aperture ratio of about 60% or less, a sufficient filtering area tends to be maintained in an attempt to make the cell walls thicker, with the result that the pressure loss tends not to increase and the strength of the honeycomb structure tends not to reduce.

Here, the aperture ratio of the honeycomb structure refers to an aperture ratio on a cross-section in the center of the honeycomb structure, that is, an aperture ratio on a cross-section obtained when the honeycomb structure is cut perpendicularly to the longitudinal direction at the mid point in the longitudinal direction.

Moreover, a catalyst may be supported on at least one portion of the honeycomb structure.

In the honeycomb structure, with a catalyst that may make it possible to convert toxic gas components such as CO, HC, NOx in exhaust gases being supported thereon, toxic gas components in the exhaust gases tend to be converted by the catalytic action. Further, by supporting a catalyst that helps burning of particulates, particulates tend to be more easily or successively burned and removed. As a result, in the above-mentioned honeycomb structure, the performance of converting exhaust gases tends to improve, and further, the energy for burning particulates tends to be reduced.

When the honeycomb structure includes a laminate of plural lamination members in the longitudinal direction, the catalyst may be supported on at least a portion of these lamination members.

Examples of the above-mentioned catalyst include: catalyst made of noble metal element such as platinum, palladium, and rhodium, although not particularly limited thereto. With respect to the above-mentioned catalyst, in addition to the catalysts made of these noble metal elements, a compound containing an alkali metal element (Group 1 in Element Periodic Table), an alkaline-earth metal element (Group 2 in Element Periodic Table), a rare-earth element (Group 3 in Element Periodic Table) or a transition metal element may be supported thereon.

Moreover, when applying the catalyst to the honeycomb structure, the surface of the honeycomb structure may be coated with a catalyst supporting layer such as alumina in advance, and the catalyst may be applied thereto. Examples of the catalyst supporting layer include: oxide ceramics such as alumina, titania, zirconia, silica and ceria.

The specific modes of the above-mentioned honeycomb structure are mainly divided into the following three modes.

The first mode is a mode in which a plurality of lamination members are laminated in the longitudinal direction so that the cells are superposed on one another (hereinafter, this mode of the honeycomb structure is referred to also as a laminated honeycomb structure); the second mode relates to a mode in which a plurality of pillar-shaped porous ceramic members, each having a plurality of cells formed in parallel with one another in the longitudinal direction with a cell wall therebetween, are combined with one another by interposing a sealing material layer (hereinafter, the honeycomb structure of this mode is also referred to as an aggregated honeycomb structure); and the third mode relates to a mode in which a honeycomb structure is provided with a (integral) single honeycomb member integrally formed as a whole (hereinafter, the honeycomb structure of this mode is also referred to as an integral honeycomb structure).

Here, with respect to the honeycomb member disposed in an integral honeycomb structure, examples include: a honeycomb member including a porous ceramic body integrally sintered as a whole; a honeycomb member mainly containing inorganic fibers integrated as a whole; and a honeycomb member mainly containing metal integrated as a whole.

Among the above, a laminated honeycomb structure and an integral honeycomb structure provided with a honeycomb member mainly containing inorganic fibers or mainly containing metal are suitable for the honeycomb filter according to the embodiments of the present invention.

In the cases of an aggregated honeycomb structure and an integral honeycomb structure including a honeycomb member having a porous ceramic integrally sintered as a whole, upon pressing the honeycomb structure into a metal casing, a slight distortion in the degrees of outline, flatness, perpendicularity and the like of the honeycomb structure occasionally causes difficulty in canning or breaks cell walls on the outermost periphery, while such problems tend not to occur in the laminated honeycomb structure, the integral honeycomb structure provided with the honeycomb member mainly containing inorganic fibers or the integral honeycomb structure provided with the honeycomb member mainly containing metal.

With reference to drawings, the following description will explain the honeycomb filter including the laminated honeycomb structure and a metal casing according to the embodiments of the present invention.

Figure 2A:
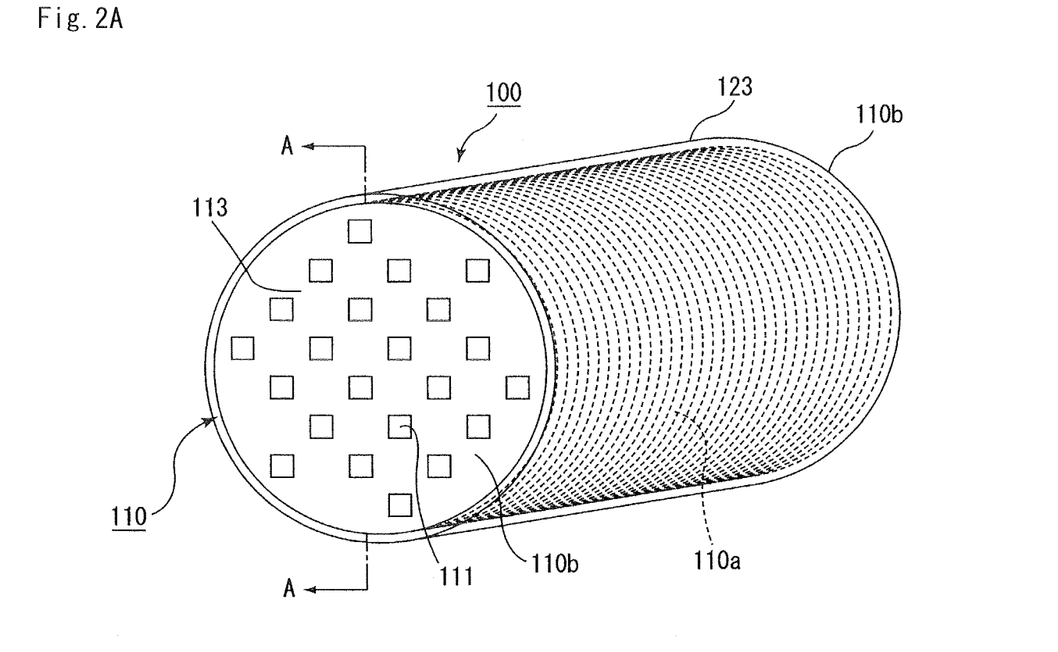
FIG. 2A is a perspective view that schematically shows one example of a honeycomb filter according to one embodiment of the present invention.
Figure 2B:
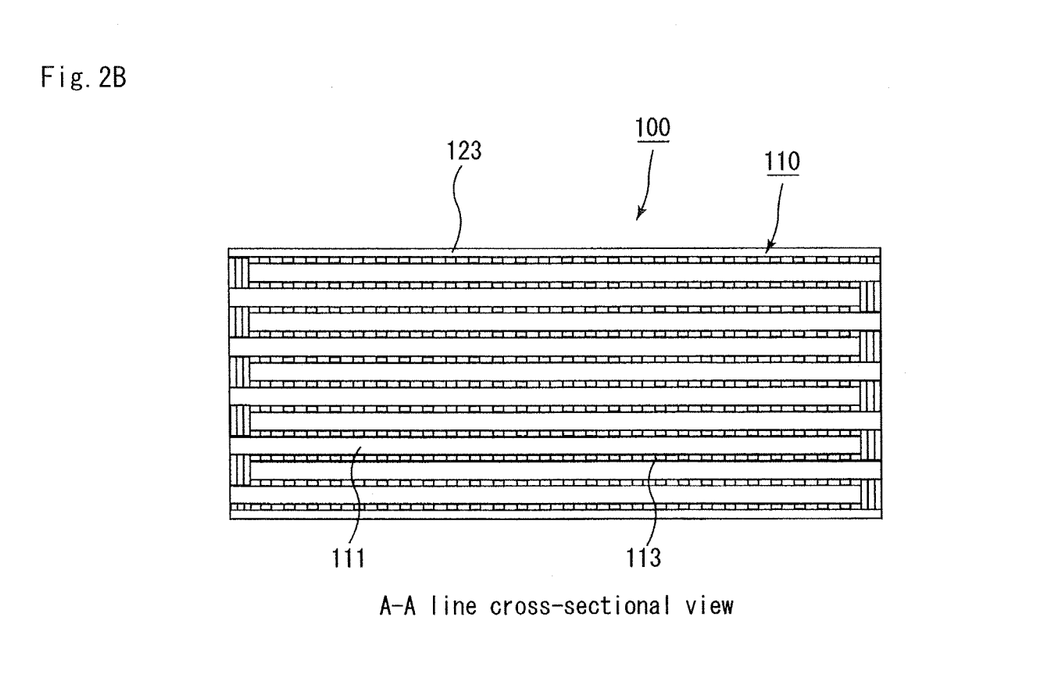
FIG. 2B is a cross-sectional view taken along line A-A of FIG. 2A.

FIG. 2A is a perspective view that schematically shows one example of the honeycomb filter according to one embodiment of the present invention, and FIG. 2B shows a cross-sectional view taken along line A-A of FIG. 2A.

A laminated honeycomb structure 110 constituting the honeycomb filter 100 has a cylindrical shape in which a number of cells 111 with either one of ends being sealed are placed in parallel with one another in the longitudinal direction with a wall portion (cell wall) 113 therebetween.

In other words, as shown in FIG. 2B, the cell 111 has either one of the end portions corresponding to the inlet side or the outlet side of exhaust gases sealed so that exhaust gases that have flowed into one of the cells 111 are allowed to flow out of another cell 111 after passing through the cell wall 113 that separates the cells 111, and thus the cell wall 113 functions as a filter.

The laminated honeycomb structure 110 is prepared as a laminated body formed by laminating lamination members 110a, each having a thickness of at least about 0.1 mm and at most about 20 mm, and the lamination members 110a are laminated so that the cells 111 are superposed on one another in the longitudinal direction.

Here, the expression, "the lamination members are laminated so that the cells are superposed on one another", refers to the state that the lamination members are laminated so that the corresponding cells formed in adjacent lamination members are allowed to communicate with each other.

Moreover, on both ends of the laminated lamination members 110a, a plate member with a dense structure in which cells are formed in a checkered pattern is laminated as the lamination member 110b for the end portion. In other words, the lamination member for the end portion 110b is provided on each of the both end portions of the laminated honeycomb structure 110.

Here, the honeycomb structure 110 is housed in a cylindrical (can-type) metal casing 123.

The respective lamination members may be bonded to each other by an inorganic adhesive or the like, or may be simply laminated physically; however, it is more desirable for the lamination members to be simply laminated physically. When the lamination members are simply laminated physically, the flow of exhaust gases tends to be blocked by a joining portion composed of the adhesive or the like, and consequently the pressure loss tends not to become high. Here, in the case of the structure in which the respective lamination members are simply laminated physically, a laminated body is formed by laminating the lamination members in a metal casing mentioned below and a pressure is applied thereto.

The laminated honeycomb structure has a structure in which the lamination members are laminated in the longitudinal direction; therefore, even when a great temperature difference is generated over the entire filter upon regenerating process or the like, a temperature difference generated in each of the lamination members tends to be small, and since the resulting thermal stress also tends to be small, damage rarely tends to occur. For this reason, the laminated honeycomb structure is easily designed to have a high porosity in order to provide a deep-layer filtering function inside the cell walls. Moreover, in particular, when the filter is formed into a complex shape, the filter becomes extremely fragile to a thermal stress; however, the laminated honeycomb structure tends to be less susceptible to damages even when made into a complex shape.

The lamination members constituting the laminated honeycomb structure are desirably prepared as lamination members mainly containing inorganic fibers (hereinafter, also referred to as an inorganic fiber lamination member) or lamination members mainly containing metal (hereinafter, also referred to as a metal lamination member), because when those members constitute a honeycomb structure having a high porosity, the honeycomb structure is provided with high strength and heat resistance.

Upon laminating the respective lamination members, only the inorganic fiber lamination members may be laminated, or only the metal lamination members may be laminated.

Moreover, the inorganic fiber lamination member and the metal lamination member may be laminated in combination. Upon laminating these two types of members in combination, the order of lamination is not particularly limited.

Examples of the materials for the above-mentioned metal lamination members include; chromium-based stainless steel, chromium-nickel-based stainless steel and the like, although not particularly limited thereto.

Moreover, the above-mentioned metal lamination members are desirably a structured body constituted by three-dimensionally entangled metal fibers made of the above-mentioned metal; a structured body which is made of the above-mentioned metal and has penetrating pores formed therein by a pore-forming material; a structured body in which metal powder, made of the above-mentioned metal, is sintered so that pores are allowed to remain, and the like.

Examples of the material for the inorganic fibers forming the inorganic fiber lamination member include: oxide ceramics such as silica-alumina, mullite, alumina, silica, titania and zirconia; nitride ceramics such as silicon nitride and boron nitride; carbide ceramics such as silicon carbide; basalt, and the like. Each of these materials may be used alone, or two or more of them may be used in combination.

Desirably, the lower limit value of the fiber length of the inorganic fibers is set to about 0.1 mm, and the upper limit value thereof is set to about 100 mm; more desirably, the lower limit value thereof is set to about 0.5 mm, and the upper limit value thereof is set to about 50 mm. Desirably, the lower limit value of the fiber diameter of the inorganic fibers is set to about 0.3 μm, and the upper limit value thereof is set to about 30 μm; and more desirably, the lower limit value thereof is set to about 0.5 μm, and the upper limit value thereof is set to about 15 μm.

In addition to the inorganic fibers, the above-mentioned inorganic fiber lamination member may contain a binder that unites these inorganic fibers to each other so as to maintain a predetermined shape.

Examples of the binder include: inorganic glass such as silicate glass, silicate alkali glass and borosilicate glass, alumina sol, silica sol and titania sol, and the like, although not particularly limited thereto.

The inorganic fiber lamination member may contain a slight amount of inorganic particles and metal particles.

Moreover, in the inorganic fiber lamination member, desirably the inorganic fibers are fixed with one another by an inorganic matter and the like containing silica. In this case, desirably, the vicinity of each intersecting portion between the inorganic fibers is firmly fixed to each other. With this structure, the inorganic fiber lamination member tends to become superior in the strength and flexibility.

Examples of the above-mentioned inorganic matter containing silica include: inorganic glass such as silicate glass, silicate alkali glass and borosilicate glass.

Here, the inorganic fiber lamination member, in which the inorganic fibers are firmly fixed with one another by an inorganic matter and the like containing silica, may be those on which an acid treatment and the like are further carried out.

Moreover, a lamination member for the end portion in which cells are formed in a checkered pattern is desirably laminated on both ends of the laminated inorganic fiber lamination members and/or metal lamination members. In other words, the lamination member for the end portion is desirably provided on each of the both end portions of the honeycomb structure.

By laminating the lamination members for the end portion thereon, it is possible to seal one of the end portions of each of the cells, without sealing the cell formed by laminating the inorganic fiber lamination members and/or the metal lamination members at the end portion with a plug.

The lamination member for the end portion may be prepared as a member made of the same material as the inorganic fiber lamination member and the metal lamination member, with cells formed in a checkered pattern, or as a plate member with a dense structure in which cells are formed in a checkered pattern.

In the present specification, the dense structure refers to a structure having a porosity smaller than the lamination member, and specific materials thereof include, for example, metals, ceramics and the like.

In the case where the above-mentioned plate member with a dense structure is used, the lamination member for the end portion tends to be thinner.

With respect to the lamination member for the end portion, those made of a metal is desirably used.

Moreover, in the case where only metal lamination members are used as the lamination members and in the case where a metal lamination member or a metal plate member, each of which have cells formed in a checkered pattern, is laminated on either end of the laminated inorganic fiber lamination members and/or metal lamination members, in other words, in the case where both end portions of the honeycomb structure are a metal lamination member with cells formed in checkered pattern or a plate member made of metal with cells formed in checkered pattern, the resulting product tends not to be eroded even after use for a long period of time.

Further, in the laminated honeycomb structure, as a lamination member, a lamination member mainly including porous ceramic (hereinafter also referred to as a ceramic lamination member) may also be used.

Examples of the material of the porous ceramic constituting the ceramic lamination member include: nitride ceramics such as aluminum nitride, silicon nitride, boron nitride and titanium nitride; carbide ceramics such as silicon carbide, zirconium carbide, titanium carbide, tantalum carbide and tungsten carbide; oxide ceramics such as alumina, zirconia, cordierite, mullite, silica and aluminum titanate; and the like. Here, the ceramic lamination member may be formed by two or more kinds of materials, such as a composite body of silicon and silicon carbide.

Moreover, in the above-mentioned laminated honeycomb structure, when ceramic lamination members having different cell dimensions are manufactured and those are laminated one after another, irregularities are formed on the inner surface of each cell so that the filtering area becomes greater, and thus it may presumably suitable to further reduce the pressure loss upon capturing particulates.

The shape of the cells on the plan view is not particularly limited to a quadrangular shape, and may be any optional shape, such as a triangle, a hexagon, an octagon, a dodecagon, a round shape and an elliptical shape.

Moreover, in the case where ceramic lamination members are laminated, lamination members for the end portion such as plate members having a dense structure may be laminated on either end of the laminate of the ceramic lamination members.

In the above-mentioned honeycomb filter, laminated honeycomb structure having the above-mentioned structure is housed in a cylindrical metal casing.

Examples of the material for the metal casing include stainless, iron and the like.

The shape of the metal casing may be undividable cylindrical shape, or cylindrical shape that can be divided into two or a plurality of division members (for example, a clam shell type metal casing and the like).

Next, the following description will discuss the integral honeycomb structure provided with the honeycomb member mainly containing the inorganic fibers or mainly containing the metal.

The integral honeycomb structure provided with the honeycomb member mainly containing the inorganic fibers has the same configuration as in the above-mentioned laminated honeycomb structure, except that the integral honeycomb structure is provided with a single honeycomb member mainly containing the inorganic fibers and integrally formed as a whole in place of a plurality of the laminated lamination members.

The integral honeycomb structure provided with a honeycomb member mainly containing the metal has the same configuration as in the above-mentioned laminated honeycomb structure, except that the integral honeycomb structure is provided with a single honeycomb member mainly containing metal and integrally formed as a whole in place of a plurality of the laminated lamination members.

Therefore, the integral honeycomb structure provided with the honeycomb member mainly containing the inorganic fibers or the metal presumably tends to enjoy the same effects as in the laminated honeycomb structure, and as in the case of the laminated honeycomb structure, the integral honeycomb structure is suitable for the honeycomb structure configuring the honeycomb filter according to the embodiments of the present invention.

Moreover, the lamination member may be also provided on each of the both end portions of the integral honeycomb structure provided with the honeycomb member mainly containing the inorganic fibers or metal, if necessary.

Moreover, in the honeycomb filter according to the embodiments of the present invention, as mentioned above, it is not necessary to interpose a mat-shaped member between the honeycomb structure and a metal casing, and with respect to the embodiments of the honeycomb filter described so far in the above, the honeycomb structure directly contacts with the metal casing.

However, in the honeycomb filter according to the embodiments of the present invention, as long as the shortest distance between the outermost cells and the inner face of the metal casing is at least about 1 mm and at most about 3 mm, the honeycomb structure does not necessarily directly contact with the metal casing, and a mat-shaped member or a metal plate and the like may be interposed between them. In this case, the mat-shaped member and the metal plate are desirably those having a thin thickness and also a high thermal conductivity.

In the conventional honeycomb structure, in the case where the mat-shaped member is interposed on the outer periphery of the honeycomb structure, since the mat-shaped member has a heat-insulating property and since the distance between the inner peripheral face of the metal casing and the outermost cells of the honeycomb structure becomes longer due to the thickness of the mat-shaped member, heat, which has transmitted to the honeycomb structure when exhaust gases pass through it, has tended not to escape outside through the metal casing.

Moreover, regardless of the presence or absence of the mat-shaped member, also in the case where the distance between the cells on the outermost layer of the honeycomb structure and the metal casing is great, the heat, which has transmitted to the honeycomb structure when exhaust gases pass through it, has tended not to escape outside through the metal casing.

In such a case, since the temperature gradient in the diameter direction inside the honeycomb structure has tended to become smaller, exhaust gases have tended to easily flow in the center portion of the honeycomb structure along its streamline.

Moreover, in a honeycomb structure having a high porosity (for example, porosity of about 70% or more) with the purpose that particulate matters (PM) in exhaust gases are deep-layer filtered through the inside of a cell wall so that captured PM are made in contact with a catalyst supported inside the cell wall to be continuously burned and eliminated, PM are continuously burned and deep-layer filtered so that pressure loss due to captured PM tends not to increase even after a long-term use.

For this reason, in the case of such a honeycomb structure having a high porosity, in particular, in the same manner as the initial state prior to capturing PMs, PMs tend to easily flow only in the center portion of the honeycomb structure along the direction in which exhaust gases easily flow.

When the exhaust gases tend to easily flow only in the center portion of the honeycomb structure in this manner, the entire apparent filtering areas of the honeycomb structure tends not to be utilized effectively, causing a reduction in the capture efficiency. Here, the apparent filtering area refers to the total sum of surface areas of all the cells opened on the inlet side of exhaust gases in which surface irregularities are not taken into consideration.

Moreover, in order to prevent the reduction in the capture efficiency, it is necessary to increase the filter size (size of the honeycomb structure).

In contrast, in the honeycomb fiber according to the embodiments of the present invention, the distance between the cell walls on the outermost periphery of the honeycomb structure and the metal casing is made smaller. Therefore, the entire apparent filtering areas of the honeycomb structure is effectively used so that the capture efficiency can be improved without the necessity of increasing the filter size, and consequently, exhaust gases tend to flow through the entire honeycomb structure more evenly.

In other words, in the honeycomb filter according to the embodiments of the present invention, since the shortest distance between the outermost cells and the inner face of the metal casing is at least about 1 mm and at most about 3 mm, the outer peripheral portion of the honeycomb structure is maintained at a lower temperature in comparison with the center portion, and a temperature difference tends to take place easily between these two portions so that exhaust gases tend to flow into the outer peripheral portion of the honeycomb structure. Consequently, the flow rate of gases passing through cell walls of the honeycomb filter tends to be made relatively slower; thus, the capture efficiency of the honeycomb filter tends to be improved.

In the honeycomb filter according to the embodiments of the present invention, unlike conventional honeycomb filters, it is not necessary to interpose a mat-shaped member between the honeycomb structure and a metal casing. Therefore, in the honeycomb filter according to the embodiments of the present invention, the size of honeycomb filters tends to be reduced and the number of manufacturing processes tends to be reduced.

Figure 3A:
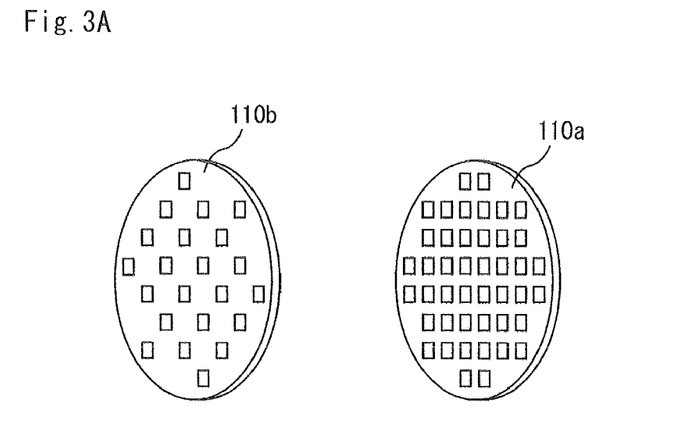
FIG. 3A is a perspective view that schematically shows lamination members constituting a honeycomb structure used in the honeycomb filter according to one embodiment of the present invention.
Figure 3B:
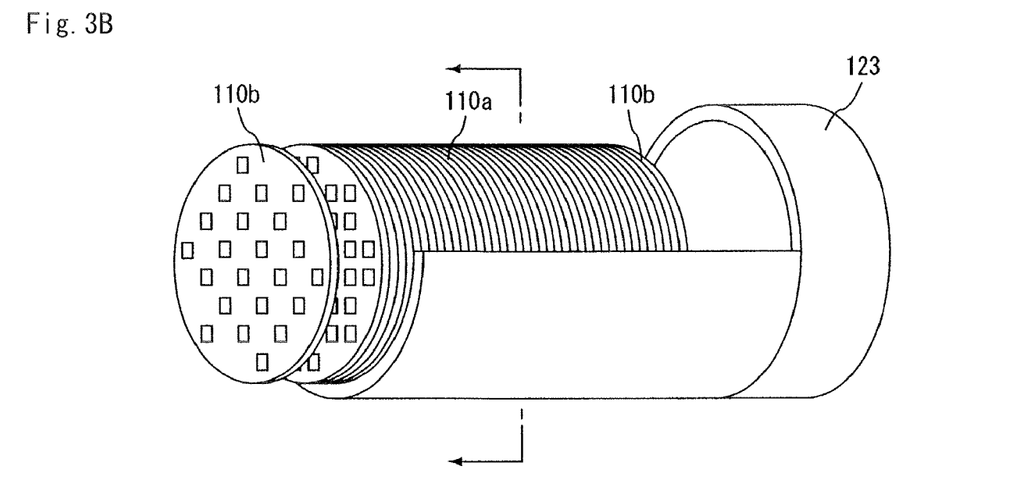
FIG. 3B is a perspective view that shows a state in which the lamination members shown in FIG. 3A are laminated to manufacture a honeycomb filter.

Next, referring to FIGS. 3A and 3B, the following description will discuss a method for manufacturing the honeycomb filter provided with a laminated honeycomb structure according to the embodiments of the present invention.

FIG. 3A is a perspective view that schematically shows lamination members constituting a honeycomb structure used in the honeycomb filter according to one embodiment of the present invention; and FIG. 3B is a perspective view that shows a state in which the lamination members shown in FIG. 3A are laminated to manufacture a honeycomb filter.

(1) Method for Manufacturing the Metal Lamination Member

First, a laser machining process or a stamping process is carried out on a porous metal plate mainly made of metal and having a thickness of at least about 0.1 mm and at most about 20 mm, so that cells are formed over the almost entire face with almost equal intervals; thus, a lamination member 110a having a predetermined thickness with cells formed in a high density as shown in FIG. 3A is manufactured.

Moreover, in the case of manufacturing a lamination member for the end portion used in sealing the end portion of the cells (lamination member for sealing the end portion of the cells) that is placed in the vicinity of the end face of the laminated honeycomb structure and which forms the sealed portion of the cells, the cells thereof are formed in a checkered pattern during the laser machining process so that a lamination member for the end portion (lamination member for sealing the end portion of the cells) 110b with a low density of predetermined cells shown in FIG. 3A is manufactured.

By using one or several lamination members for the end portion (lamination members for sealing the end portion of the cells) 110b with the low density of cells for the end portions, after laminating a plurality of lamination members 110a, a laminated honeycomb structure capable of functioning as a filter can be obtained without carrying out the process of sealing predetermined cells at the end portion.

Next, if necessary, a catalyst is supported on the metal lamination member.

Specifically, for example, an oxide catalyst or an alumina film having a large specific surface is formed on the surface of the metal lamination member, and a catalyst such as platinum is applied to the surface of the alumina film.

Examples of the method for supporting the oxide catalyst include a method in which the metal lamination member is immersed for about 5 minutes in a solution containing about 10 g of CZ ($nCeO_2 \cdot mZrO_2$), about 1 L (liter) of ethanol, about 5 g of citric acid and a proper amount of pH adjusting agent, and a firing process at about 500° C. is then carried out, and the like.

In this method, the amount of catalyst to be supported can be adjusted by repeating the above-mentioned immersing and firing processes.

(2) Method for Manufacturing the Inorganic Fiber Lamination Member

First, a sheet-forming slurry is prepared. More specifically, for example, inorganic fibers and an inorganic matter such as inorganic glass are sufficiently mixed, and an appropriate amount of water, an organic binder, an inorganic binder, etc. are added to this on demand, and this is sufficiently stirred to prepare the sheet-forming slurry.

Next, by using the sheet-forming slurry, a lamination member mainly composed of inorganic fibers is produced by a sheet-forming process.

More specifically, the sheet-forming slurry is formed into a sheet by using a mesh, and the resulting product is dried at a temperature of at least about 100° C. and at most about 200° C., and a stamping process is carried out thereon so that cells are formed over almost the entire face with equal intervals, and then a heating treatment is further carried out at a temperature of at least about 900° C. and at most about 1050° C. so that a lamination member 110a having a predetermined thickness with cells formed therein with a high density, as shown in FIG. 3A, is obtained.

Moreover, in the case of manufacturing a lamination member for the end portion used in sealing the end portion of the cells (lamination member for sealing the end portion of the cells) that is placed at the vicinity of the end faces of the laminated honeycomb structure and which forms the sealed portion of the cells, the sheet-forming slurry is formed into a sheet by using a mesh, and the resulting product is dried at a temperature of at least about 100° C. and at most about 200° C., and a stamping process is carried out thereafter so that cells are formed in a checkered pattern, and then a heating treatment is further carried out at a temperature of at least about 900° C. and at most about 1050° C. to manufacture a lamination member for the end portion (lamination member for sealing the end portion of the cells) 110b with predetermined cells formed therein with a low density as shown in FIG. 3A.

Such methods are suitable for manufacturing a lamination member with inorganic fibers fixed to one another with an inorganic matter such as inorganic glass.

Here, the inorganic fibers are desirably fused to one another with an inorganic matter such as inorganic glass. As mentioned above, by incorporating an inorganic matter such as inorganic glass in the interior portion of the inorganic fibers, and carrying out a heating treatment, the inorganic matter fused by the heating treatment tends to be cooled and solidified in the vicinity of each intersecting portion between the inorganic fibers, and thus each intersecting portion between the inorganic fibers tends to be locally fixed by the inorganic matter.

After the heating treatment, an acid treatment or a quenching treatment may be carried out, if necessary.

A catalyst may be adhered to the inorganic fiber lamination member, if necessary.

With respect to the method for adhering the catalyst, the same method as those for adhering a catalyst on a metal laminating member can be used.

(3) Laminating Process of Lamination Members

As shown in FIG. 3B, a cylindrical metal casing 123 having a pressing metal member on its one side is used, and after one to several of the lamination members 110b for the end portion, manufactured in the process (1) or (2), are laminated in the metal casing 123, a predetermined number of inside lamination members 110a are laminated thereon. Lastly, one to several of the lamination members 110b for the end portion are laminated thereon, and a pressing process is further carried out thereon, and a pressing metal member is also placed and secured onto the other end. Thus, a honeycomb filter which is completed with the canning process is manufactured. Moreover, with respect to the honeycomb filter manufactured in this method, the lamination member for the end portion is provided on each of the both end portions of the honeycomb structure. Of course, in these processes, the respective lamination members are laminated in such a manner that the cells are superposed on one another.

Here, in the case where a plate member made of metal is used as the lamination members for the end portion, a welding process may be carried out on this lamination member so that it can be used as the pressing member.

Moreover, in the case where a laminated honeycomb structure including the inorganic fiber lamination members is used, since the porosity decreases as the lamination members become thinner upon being pressed, the lamination members need to be manufactured by taking this reduced portion into consideration.

Although the use of the honeycomb filter according to the embodiments of the present invention is not particularly limited, it is desirably applied to an exhaust gas purifying device for a vehicle.

The exhaust gas purifying device has, for example, a structure in which one end of the metal casing which houses the honeycomb structure is connected to an exhaust gas introducing pipe that is connected to an internal combustion engine such as a diesel engine, and the other end portion of the metal casing is connected to an exhaust gas discharging pipe that is connected to outside.

In an exhaust gas purifying device having such structure, the exhaust gas emitted from an internal combustion engine, such as an engine, flows through the exhaust gas introducing pipe to the honeycomb structure, and passes through the cell wall of the honeycomb structure, where particulates are captured, so that the gas is purified and then emitted outside through the exhaust gas discharging pipe.

When particulates captured at the cell walls of the honeycomb structure is accumulated, a regenerating process of the honeycomb structure is carried out.

The regenerating process of the honeycomb structure means burning of the captured particulates, and examples of the process for regeneration include a post-injection method, a method for heating the honeycomb structure by a heating means provided at the side at which the exhaust gas flows in, a method for continuously progressing the regenerating process by placing on the filter a catalyst which is capable of directly oxidizing particulates which are solid objects, and a method in which $NO_x$ is oxidized by an oxide catalyst provided at the upper stream side of the honeycomb structure so that $NO_2$ is generated, and particulates are oxidized using the generated $NO_2$, and the like.

EXAMPLES

The following examples will illustrate the present invention; however, the present invention is not intended to be limited by these examples.

Example 1

(1) Preparation Process of Sheet-Forming Slurry

First, alumina fibers (50 parts by weight), glass fibers (average fiber diameter: 9 μm, average fiber length: 3 mm) (50 parts by weight) and an organic binder (polyvinyl alcohol-based fibers) (10 parts by weight) were dispersed in a sufficient amount of water, and this was sufficiently stirred to prepare a sheet-forming slurry.

(2) Sheet-Forming Process and Cell-Forming Process

The slurry obtained in the process (1) was formed into a sheet by using a mesh having a diameter of 130 mm, and the resulting matter was dried at 135° C. so that a sheet-shaped inorganic composite body having a diameter of 130 mm was obtained.

Next, a stamping process was carried out on the obtained product to form cells in almost the whole surface of the sheet-shaped inorganic composite body in such a manner that the resulting product had a shortest distance between the outer edge of the sheet-shaped inorganic composite body and the minimum inclusion shape of cells of 1 mm, a cell density of 3.7 pcs/cm$^2$ and a cell-wall thickness (distance between adjacent cells) of 2 mm.

(3) Heating Treatment Process

A heating treatment at 950° C. was carried out on the sheet-shaped inorganic composite body obtained in the process (2) for one hour, together with a pressure being applied thereto so that an inorganic fiber lamination member was obtained. Here, in this process, the alumina fibers were firmly fixed with one another through glass.

(4) Acid Treatment and Quenching Treatment

An acid treatment was carried out by immersing the inorganic fiber lamination member obtained in the process (3) with 4 mol/L of a HCl solution at 90° C. for one hour, and then a quenching treatment was carried out at 1050° C. for 5 hours.

Thus, an inorganic fiber lamination member having a porosity of 88% and a thickness of 1 mm was manufactured.

(5) Preparation of Lamination Member for the End Portion (Metal Plate Member Having a Dense Structure)

After a Ni—Cr alloy metal member (metal plate having a dense structure) had been machined into a disc shape of 130 mm in diameter×1 mm in thickness, a laser machining process was further carried out on the resulting member so that a lamination member for the end portion in which cells were formed in a checkered pattern, with a cell density of about 1.86 pcs/cm$^2$ and a cell-wall thickness (distance between adjacent cells) of 2 mm was manufactured.

Here, the lamination member for the end portion, which had cells formed in a checkered pattern, was set to a cell density that was almost half that of the lamination member.

(6) Lamination Process

First, in a separated process, a metal casing (made of stainless steel) to which a pressing metal member was attached to one side thereof was placed, with the side bearing the metal member attached thereto facing down. After one of the lamination members for the end portion obtained in the process (5) had been laminated, 110 pieces of the inorganic fiber lamination members obtained in the process (4) were laminated thereon, and lastly, one of the lamination members for an end portion was laminated thereon, and a pressing process was further carried out thereon. Then, another pressing metal member was also put on the other side and secured thereon so that a honeycomb filter, in which a laminated honeycomb structure having a length of 90 mm was housed in the metal casing, was manufactured. Here, the honeycomb structure, obtained through the pressing process, had a porosity of 85% and an average pore diameter of 35 μm. In this process, the respective sheets were laminated in such a manner that the cells were superposed on one another. Moreover, the lamination member for the end portion was provided on each of the both end portions of the above-mentioned honeycomb structure.

In the honeycomb filter manufactured according to this example, the shortest distance between outermost cells of the laminated honeycomb structure and the inner face of the metal casing was 1 mm.

Examples 2 and 3

By adjusting the diameter of the mesh in accordance with the diameter of the honeycomb structure and carrying out basically the same processes as those of Example 1, honeycomb structures having shapes shown in Table 1 were manufactured.

Here, in Examples 2 and 3, positions at which cells were to be formed through the stamping process were adjusted at the same positions as Example 1, while the diameter of the inorganic fiber lamination member was changed, so that honeycomb filters a changed shortest distance between the outermost cells and the inner face of the metal casing were manufactured.

Moreover, in conformity to the change of the diameter of the inorganic fiber lamination member, the diameter of the lamination member for the end portion was respectively changed in the same way to 132 mm (Example 2) and 134 mm (Example 3).

Example 4

(1) Manufacture of Lamination Member

A three-dimensional net-like metal porous member made of a Ni—Cr—W type alloy (product name: MA23 manufactured by Mitsubishi Materials Corp.; average pore diameter: 35 μm, porosity: 85%, thickness: 1 mm) was machined into a disc shape of 130 mm in diameter, and a laser machining process was further carried out to manufacture a metal lamination member in which cells were formed in almost the whole surface in such a manner that the shortest distance between the outer edge of the sheet-shaped inorganic composite body and the minimum inclusion shape of cells was 1 mm, a cell density was 3.7 pcs/cm$^2$ and a cell-wall thickness (distance between adjacent cells) was 2 mm.

(2) Lamination Process

A metal casing to which a pressing metal member was attached to one side thereof was placed, with the side bearing the metal member attached thereto facing down. In the same process as the process (5) of Example 1, lamination members for the end portion (metal plate member) with cells formed thereon in a checkered pattern at the predetermined positions were manufactured, and after one of the lamination members for the end portion (metal plate member) was laminated, 88 pieces of the metal lamination members were laminated thereon, and lastly, one piece of the lamination members for the end portion (metal plate member) was laminated thereon, and a pressing process was further carried out thereon. Then, another pressing metal member was also put on the other side and secured thereon so that a honeycomb filter with a laminated honeycomb structure having a length of 90 mm housed in the metal casing was obtained. The lamination member for the end portion was provided on each of the both end portions of the above-mentioned honeycomb structure.

Examples 5 and 6

By adjusting the diameter of the three-dimensional net-like metal porous member made of a Ni—Cr—W type alloy in accordance with the diameter of the honeycomb structure and carrying out basically the same processes as those of Example 4, honeycomb structures having shapes shown in Table 1 were manufactured.

Here, in Examples 5 and 6, positions at which cells were to be formed through the laser machining process were adjusted at the same positions as Example 4, while the diameter of the metal lamination member was changed, so that honeycomb filters having a changed shortest distance between the outermost cells and the inner face of the metal casing were manufactured.

Moreover, in conformity to the change of the diameter of the metal lamination member, the diameter of the lamination member for the end portion was respectively changed in the same way to 132 mm (Example 5) and 134 mm (Example 6).

Comparative Examples 1 and 2

By adjusting the diameter of the mesh in accordance with the diameter of the honeycomb structure and carrying out basically the same processes as those of Example 1, honeycomb structures having shapes shown in Table 1 were manufactured.

Here, in Comparative Examples 1 and 2, positions at which cells were to be formed through the stamping process were adjusted at the same positions as Example 1, while the diameter of the inorganic fiber lamination member was changed, so that honeycomb filters having a changed shortest distance between the outermost cells and the inner face of the metal casing were manufactured.

Moreover, in conformity to the change of the diameter of the inorganic fiber lamination member, the diameter of the lamination member for the end portion was respectively changed in the same way to 129.6 mm (Comparative Example 1) and 135 mm (Comparative Example 2).

Comparative Examples 3 and 4

By adjusting the diameter of the three-dimensional net-like metal porous member made of a Ni—Cr—W type alloy in accordance with the diameter of the honeycomb structure and carrying out basically the same processes as those of Example 4, honeycomb structures having shapes shown in Table 1 were manufactured.

Here, in Comparative Examples 3 and 4, positions at which cells were to be formed through the laser machining process were adjusted at the same positions as Example 4, while the diameter of the metal lamination member was changed, so that honeycomb filters having a changed shortest distance between the outermost cells and the inner face of the metal casing were manufactured.

Moreover, in conformity to the change of the diameter of the lamination member, the diameter of the metal lamination member for the end portion was respectively changed in the same way to 129.6 mm (Comparative Example 3), and 135 mm (Comparative Example 4).

Comparative Example 5

The same processes as those of Comparative Example 2 were carried out, except that 120 pieces of the inorganic fiber lamination members were laminated, and thereby a honeycomb filter having a length of 100 mm was manufactured.

The Table 1 shown below describes the diameter and length of the honeycomb structure, as well as the distance between the outermost cells and the inner face of the metal casing according to each of the Examples and the Comparative Examples.

(Evaluation)

(1) Measurement of Initial Capture Efficiency

Figure 4:
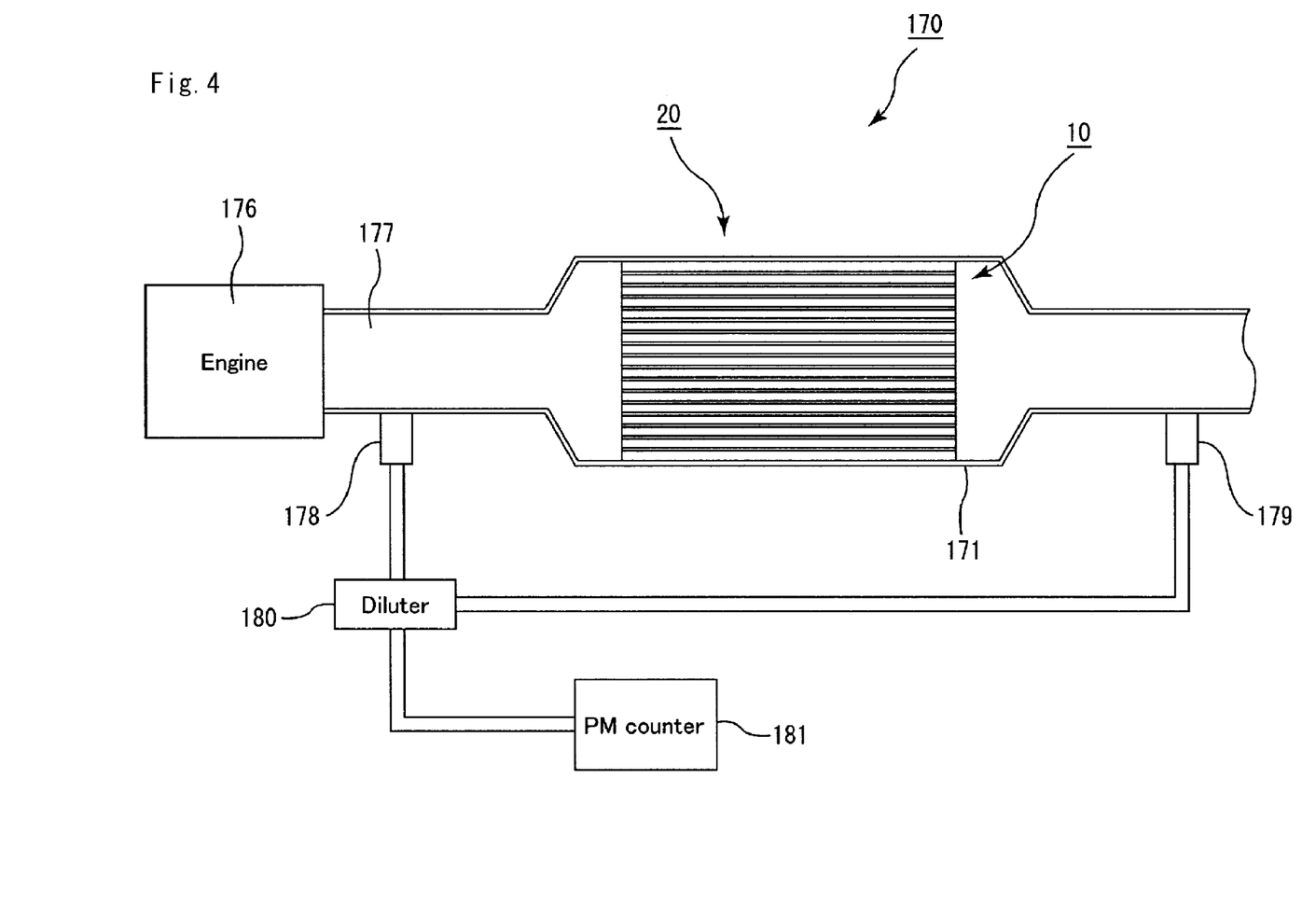
FIG. 4 is an explanatory drawing of a capture efficiency measuring device.

Measurement was carried out using a capture efficiency measuring device 170 as shown in FIG. 4. FIG. 4 is an explanatory drawing of the capture efficiency measuring device.

The capture efficiency measuring device 170 was structured as a Scanning Mobility Particle Sizer (SMPS) provided with a 2 L common-rail-type diesel engine 176, an exhaust gas pipe 177 that is connected to a honeycomb filter 20 and allows exhaust gases from the engine 176 to flow therein, the honeycomb filter 20 including a metal casing 171 that houses the honeycomb structure 10, a sampler 178 that samples exhaust gases prior to flowing through the honeycomb structure 10, a sampler 179 that samples exhaust gases after flowing through the honeycomb structure 10, a diluter 180 for diluting the exhaust gases sampled by the samplers 178 and 179, and a PM counter 181 (made by TST Inc., Condensation Particle Counter 3022A-S) that measures the amount of particulates contained in the diluted exhaust gases.

Next, measuring procedures are described. The engine 176 was driven at the number of revolutions of 2000 min$^{-1}$ with a torque of 47 Nm so that exhaust gases from the engine 176 were allowed to flow through the honeycomb structure 10. In this case, $P_0$, the amount of PM prior to flowing through the honeycomb structure 10, and $P_1$, the amount of PM after flowing through the honeycomb structure 10 were confirmed based upon the number of PM particles counted by using the PM counter 181. Then, the capture efficiency was calculated using the following equation (1):

$$\text{Capture efficiency (\%)} = (P_0 - P_1)/P_0 \times 100 \qquad (1)$$

The results are shown in Table 1.

(2) Presence or Absence of Damage to Outermost Wall

After measurements on the pressure loss, the honeycomb structure was taken out, and visually observed for the occurrence of damages such as cracks and raptures on the outside portion of the outermost cells.

The results are shown in Table 1.

TABLE 1

|  | Distance between outermost cells and inner face of metal casing (mm) | Diameter of honeycomb structure (mm) | Length of honeycomb structure (mm) | Capture efficiency (%) | Damage to outermost wall |
|---|---|---|---|---|---|
| Example 1 | 1.0 | 130.0 | 90 | 86 | None |
| Example 2 | 2.0 | 132.0 | 90 | 83 | None |
| Example 3 | 3.0 | 134.0 | 90 | 82 | None |
| Example 4 | 1.0 | 130.0 | 90 | 92 | None |
| Example 5 | 2.0 | 132.0 | 90 | 89 | None |

TABLE 1-continued

|  | Distance between outermost cells and inner face of metal casing (mm) | Diameter of honeycomb structure (mm) | Length of honeycomb structure (mm) | Capture efficiency (%) | Damage to outermost wall |
|---|---|---|---|---|---|
| Example 6 | 3.0 | 134.0 | 90 | 86 | None |
| Comparative Example 1 | 0.8 | 129.6 | 90 | 73 | Present |
| Comparative Example 2 | 3.5 | 135.0 | 90 | 76 | None |
| Comparative Example 3 | 0.8 | 129.6 | 90 | 71 | Present |
| Comparative Example 4 | 3.5 | 135.0 | 90 | 79 | None |
| Comparative Example 5 | 3.5 | 135.0 | 100 | 80 | None |

Figure 5:
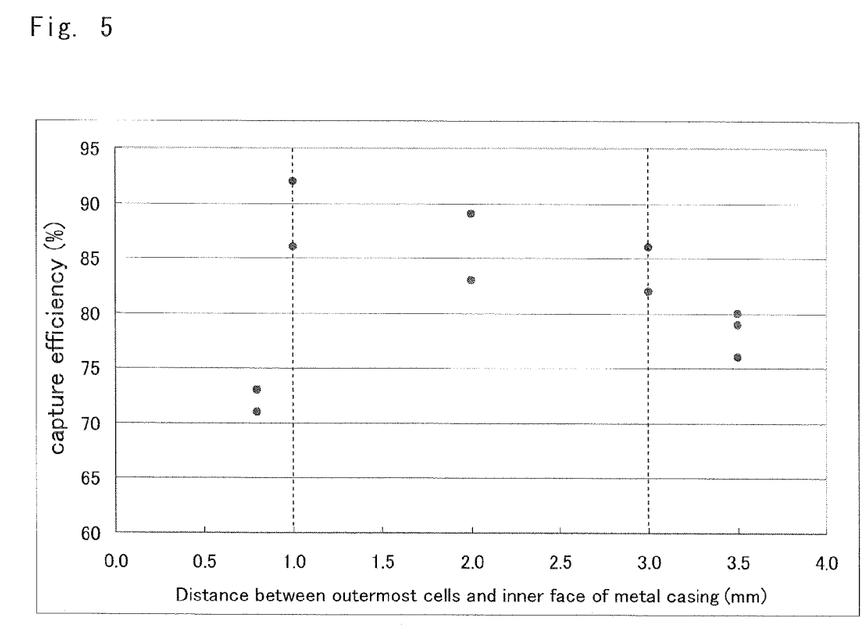
FIG. 5 is a graph that shows a relationship between a distance between cells on the outermost layer of the honeycomb structure and a metal casing and a capture efficiency in Examples and Comparative Examples.

The relationship between the distance between the cells on the outermost layer of the honeycomb structure and the metal casing and the capture efficiency in Examples and Comparative Examples is shown in FIG. 5.

As shown in Table 1 and FIG. 5, the honeycomb filters according to Examples exerted capture efficiency exceeding 80%, and ensured the superior capture efficiency, without the necessity of increasing the size of the honeycomb filter; in contrast, the honeycomb filters according to Comparative Examples had low values of 80% or less in the capture efficiency.

Moreover, in the case of honeycomb filters according to Comparative Examples 1 and 4, damages were observed on the outermost walls. This is presumably because the shortest distance between the outermost cells and the inner face of the metal casing was too short to cause insufficient strength.

It is considered that the capture efficiency became low in the honeycomb filters according to Comparative Examples 1 and 4 because of damages to the outermost walls.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A honeycomb filter comprising:
    a honeycomb structure in which a plurality of cells are placed in parallel with one another in the longitudinal direction with a cell wall therebetween; and
    a cylindrical metal casing that covers the outer peripheral side face of said honeycomb structure,
    said honeycomb structure directly contacting with said metal casing,
    an entire cross-section of said honeycomb structure taken in a direction perpendicular to the longitudinal direction and extending to an outer periphery of said honeycomb structure in contact with said metal casing is formed of a continuous material, and
    a shortest distance between the outermost cells among said plurality of cells and the inner face of said metal casing that is directly contacting with the outer periphery of said honeycomb structure being at least about 1 mm and at most about 3 mm.

2. The honeycomb filter according to claim 1, wherein a porosity of said honeycomb structure is at least about 70% and at most about 95%, and one of the end portions of each of the cells is sealed.

3. The honeycomb filter according to claim 1, wherein a distance between the adjacent cells in said plurality of cells is at least about 0.4 mm and at most about 5.0 mm.

4. The honeycomb filter according to claim 1, wherein an average pore diameter of said honeycomb structure is at least about 1 μm and at most about 100 μm.

5. The honeycomb filter according to claim 1, wherein an aspect ratio of said honeycomb structure is at least about 0.2 and at most about 0.9.

6. The honeycomb filter according to claim 1, wherein a cell density on the cross-section perpendicular to said longitudinal direction of said honeycomb structure is at least about 0.16 pcs/cm2 and at most about 93 pcs/cm2.

7. The honeycomb filter according to claim 1, wherein a size of each of said cells on the cross-section perpendicular to said longitudinal direction is at least about 0.8 mm×about 0.8 mm and at most about 16 mm×about 16 mm.

8. The honeycomb filter according to claim 1, wherein an aperture ratio of said honeycomb structure is at least about 30% and at most about 60%.

9. The honeycomb filter according to claim 1, wherein said honeycomb structure comprises a laminate of a plurality of lamination members laminated in the longitudinal direction in such a manner that the cells are superposed on one another.

10. The honeycomb filter according to claim 9, wherein said lamination members mainly comprise inorganic fibers.

11. The honeycomb filter according to claim 10, wherein said inorganic fibers are fixed to one another with an inorganic matter.

12. The honeycomb filter according to claim 10, wherein each of the both end portions of said honeycomb structure is a metal lamination member mainly comprising metal with cells formed in a checkered pattern or a plate member mainly comprising metal with cells formed in a checkered pattern.

13. The honeycomb filter according to claim 10, wherein a lamination member for the end portion comprising metal is provided on each of the both end portions of said honeycomb structure.

14. The honeycomb filter according to claim 9, wherein said lamination members mainly comprise metal.

15. The honeycomb filter according to claim 14, wherein each of the both end portions of said honeycomb structure is a metal lamination member mainly comprising metal with cells formed in a checkered pattern or a plate member mainly comprising metal with cells formed in a checkered pattern.

16. The honeycomb filter according to claim 14, wherein a lamination member for the end portion comprising metal is provided on each of the both end portions of said honeycomb structure.

17. The honeycomb filter according to claim 9, wherein said laminating members mainly comprise a porous ceramic.

18. The honeycomb filter according to claim 17, wherein a lamination member for the end portion comprising metal is provided on each of the both end portions of said honeycomb structure.

19. The honeycomb filter according to claim 9, wherein said plurality of lamination members comprise a combination of a lamination member mainly comprising inorganic fibers and a lamination member mainly comprising metal.

20. The honeycomb filter according to claim 19, wherein each of the both end portions of said honeycomb structure is a metal lamination member mainly comprising metal with cells formed in a checkered pattern or a plate member mainly comprising metal with cells formed in a checkered pattern.

21. The honeycomb filter according to claim 19, wherein a lamination member for the end portion comprising metal is provided on each of the both end portions of said honeycomb structure.

22. The honeycomb filter according to claim 9, wherein said plurality of lamination members are physically laminated.

23. The honeycomb filter according to claim 1, wherein a catalyst is supported on at least one portion of said honeycomb structure.

24. The honeycomb filter according to claim 23, wherein said catalyst comprises platinum, palladium or rhodium.

25. The honeycomb filter according to claim 23, wherein said catalyst comprises platinum, palladium or rhodium, and a compound containing an alkali metal element, an alkaline-earth metal element, a rare-earth element or a transition metal element.

26. A honeycomb filter comprising:
   a honeycomb structure mainly comprising inorganic fibers, with a plurality of cells placed in parallel with one another in the longitudinal direction with a cell wall therebetween; and
   a cylindrical metal casing that covers the outer peripheral side face of said honeycomb structure,
   said honeycomb structure directly contacting with said metal casing,
   an entire cross-section of said honeycomb structure taken in a direction perpendicular to the longitudinal direction and extending to an outer periphery of said honeycomb structure in contact with said metal casing is formed of a continuous material, and
   a shortest distance between the outermost cells among said plurality of cells and the inner face of said metal casing that is directly contacting with the outer periphery of said honeycomb structure being at least about 1 mm and at most about 3 mm.

27. The honeycomb filter according to claim 26, wherein a porosity of said honeycomb structure is at least about 70% and at most about 95%, and one of the end portions of each of the cells is sealed.

28. The honeycomb filter according to claim 26, wherein a distance between the adjacent cells in said plurality of cells is at least about 0.4 mm and at most about 5.0 mm.

29. The honeycomb filter according to claim 26, wherein an average pore diameter of said honeycomb structure is at least about 1 μm and at most about 100 μm.

30. The honeycomb filter according to claim 26, wherein an aspect ratio of said honeycomb structure is at least about 0.2 and at most about 0.9.

31. The honeycomb filter according to claim 26, wherein a cell density on the cross-section perpendicular to said longitudinal direction of said honeycomb structure is at least about 0.16 pcs/cm2 and at most about 93 pcs/cm2.

32. The honeycomb filter according to claim 26, wherein a size of each of said cells on the cross-section perpendicular to said longitudinal direction is at least about 0.8 mm×about 0.8 mm and at most about 16 mm×about 16 mm.

33. The honeycomb filter according to claim 26, wherein an aperture ratio of said honeycomb structure is at least about 30% and at most about 60%.

34. The honeycomb filter according to claim 26, wherein said honeycomb structure mainly comprises inorganic fibers and is provided with a honeycomb member integrally formed as a whole.

35. The honeycomb filter according to claim 34, wherein each of the both end portions of said honeycomb structure is a metal lamination member mainly comprising metal with cells formed in a checkered pattern or a plate member mainly comprising metal with cells formed in a checkered pattern.

36. The honeycomb filter according to claim 34, wherein a lamination member for the end portion comprising metal is provided on each of the both end portions of said honeycomb structure.

37. The honeycomb filter according to claim 26, wherein a catalyst is supported on at least one portion of said honeycomb structure.

38. The honeycomb filter according to claim 37, wherein said catalyst comprises platinum, palladium or rhodium.

39. The honeycomb filter according to claim 37, wherein said catalyst comprises platinum, palladium or rhodium, and a compound containing an alkali metal element, an alkaline-earth metal element, a rare-earth element or a transition metal element.

40. A honeycomb filter comprising:
   a honeycomb structure mainly comprising metal, with a plurality of cells placed in parallel with one another in the longitudinal direction with a cell wall therebetween; and
   a cylindrical metal casing that covers the outer peripheral side face of said honeycomb structure,
   said honeycomb structure directly contacting with said metal casing,
   an entire cross-section of said honeycomb structure taken in a direction perpendicular to the longitudinal direction and extending to an outer periphery of said honeycomb structure in contact with said metal casing is formed of a continuous material, and
   a shortest distance between the outermost cells among said plurality of cells and the inner face of said metal casing that is directly contacting with the outer periphery of said honeycomb structure being at least about 1 mm and at most about 3 mm.

41. The honeycomb filter according to claim 40, wherein a porosity of said honeycomb structure is at least about 70% and at most about 95%, and one of the end portions of each of the cells is sealed.

42. The honeycomb filter according to claim 40, wherein a distance between the adjacent cells in said plurality of cells is at least about 0.4 mm and at most about 5.0 mm.

43. The honeycomb filter according to claim 40, wherein an average pore diameter of said honeycomb structure is at least about 1 μm and at most about 100 μm.

44. The honeycomb filter according to claim 40, wherein an aspect ratio of said honeycomb structure is at least about 0.2 and at most about 0.9.

45. The honeycomb filter according to claim 40, wherein a cell density on the cross-section perpendicular to said longitudinal direction of said honeycomb structure is at least about 0.16 pcs/cm2 and at most about 93 pcs/cm2.

46. The honeycomb filter according to claim 40, wherein a size of each of said cells on the cross-section perpendicular to said longitudinal direction is at least about 0.8 mm×about 0.8 mm and at most about 16 mm×about 16 mm.

47. The honeycomb filter according to claim 40, wherein an aperture ratio of said honeycomb structure is at least about 30% and at most about 60%.

48. The honeycomb filter according to claim 40, wherein said honeycomb structure mainly comprises metal and is provided with a honeycomb member integrally formed as a whole.

49. The honeycomb filter according to claim 48, wherein each of the both end portions of said honeycomb structure is a metal lamination member mainly comprising metal with cells formed in a checkered pattern or a plate member mainly comprising metal with cells formed in a checkered pattern.

50. The honeycomb filter according to claim 48, wherein a lamination member for the end portion comprising metal is provided on each of the both end portions of said honeycomb structure.

51. The honeycomb filter according to claim 40, wherein a catalyst is supported on at least one portion of said honeycomb structure.

52. The honeycomb filter according to claim 51, wherein said catalyst comprises platinum, palladium or rhodium.

53. The honeycomb filter according to claim 51, wherein said catalyst comprises platinum, palladium or rhodium, and a compound containing an alkali metal element, an alkaline-earth metal element, a rare-earth element or a transition metal element.

* * * * *